(12) United States Patent
Yamashita et al.

(10) Patent No.: US 7,308,398 B2
(45) Date of Patent: Dec. 11, 2007

(54) TRANSLATION CORRELATION DEVICE

(75) Inventors: Tatsuo Yamashita, Kawasaki (JP);
Akira Ushioda, Kawasaki (JP);
Masaru Fuji, Kawasaki (JP); Seiji Okura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/289,318

(22) Filed: Nov. 30, 2005

(65) Prior Publication Data
US 2006/0080080 A1 Apr. 13, 2006

Related U.S. Application Data

(63) Continuation of application No. PCT/JP03/006869, filed on May 30, 2003.

(51) Int. Cl.
*G06F 17/28* (2006.01)
(52) U.S. Cl. .......................................... 704/2
(58) Field of Classification Search .................... None
See application file for complete search history.

(56) References Cited

U.S. PATENT DOCUMENTS

| | | | | |
|---|---|---|---|---|
| 5,844,798 | A * | 12/1998 | Uramoto | 704/2 |
| 5,867,811 | A * | 2/1999 | O'Donoghue | 704/1 |
| 5,893,134 | A * | 4/1999 | O'Donoghue et al. | 704/8 |
| 2002/0052730 | A1 * | 5/2002 | Nakao | 704/10 |
| 2002/0091509 | A1 * | 7/2002 | Zoarez et al. | 704/6 |
| 2003/0040899 | A1 * | 2/2003 | Ogilvie | 704/2 |
| 2003/0225570 | A1 * | 12/2003 | Boys | 704/3 |

FOREIGN PATENT DOCUMENTS

| | | |
|---|---|---|
| JP | 5-282361 | 10/1993 |
| JP | 9-160918 | 6/1997 |
| JP | 9-179868 | 7/1997 |
| JP | 9-198390 | 7/1997 |

OTHER PUBLICATIONS

Masahiko Haruno, "Taiyaku Text Kara Jisho o Jido Sakusei", Joho Shori, Apr. 15, 1999, vol. 40, No. 4, pp. 374 to 379.
Hajime Uchino, Masahiko Haruno, Yamato Takahashi, Satoshi Shirai, "Kikai Hon'yaku Jisho Kochiku Shien Tool", NTT R & D, Dec. 10, 1997, vol. 46, No. 12, pp. 1425 to 1432.
Masahiko Haruno, "Jisho to Tokei o Mochiita Taiyaku Alignment", Transactions of Information Processing Society of Japan, Apr. 15, 1997, vol. 38, No. 4, pp. 719 to 726.
Masahiko Haruno, Takefumi Yamazaki, "Jisho to Tokei o Mochiita Taiyaku Alignment", Information Processing Society of Japan Kenkyu Hokoku 96-NL-112-4, Mar. 15, 1996, vol. 96, No. 27, pp. 23 to 30.

(Continued)

*Primary Examiner*—Abul K. Azad
(74) *Attorney, Agent, or Firm*—Staas & Halsey LLP

(57) ABSTRACT

A confirmation link edition unit receives a confirmation link specified by a user. A paragraph correlation unit respectively divides an English text and a Japanese text into a plurality of paragraphs according to the specified confirmation link. A segment correlation calculation unit correlates an English segment to a Japanese segment for each paragraph. A correlation edition unit provides a user the correspondence obtained by the segment correlation calculation unit, and edits the correspondence according to a correction instruction from the user if any.

9 Claims, 20 Drawing Sheets

OTHER PUBLICATIONS

William Gale et al., "A Program for Aligning Sentences in Bilingual Corpora", The Association for Computational Linguistics, 1993.

Masahiko Haruno, "Special feature series; Review of current position of natural language processing technology, its ever expanding fields of application", Magazine of the Information Processing Society of Japan, vol. 40, No. 4, Apr. 15, 1999, pp. 374-379.

"Design Tools for Japanese-to-English Machine Translation Dictionaries", NTT R&D, vol. 46, No. 12, Dec. 10, 1997, pp. 1425-1432.

"Bilingual Text Alignment Using Statistical and Dictionary Information", Transactions of Information Processing Society of Japan, vol. 38, No. 4, Apr. 15, 1997, pp. 719-726.

"Bilingual Text Alignment Using Statistical and Dictionary Information", Research Reports of Information Processing Society of Japan, 96-NL-112-4, vol. 96, No. 27, Mar. 15, 1996, pp. 23-30.

Japanese Notice of Rejection Grounds, mailed Jan. 16, 2007, and issued in corresponding Japanese Patent Application No. 2005-500235.

* cited by examiner

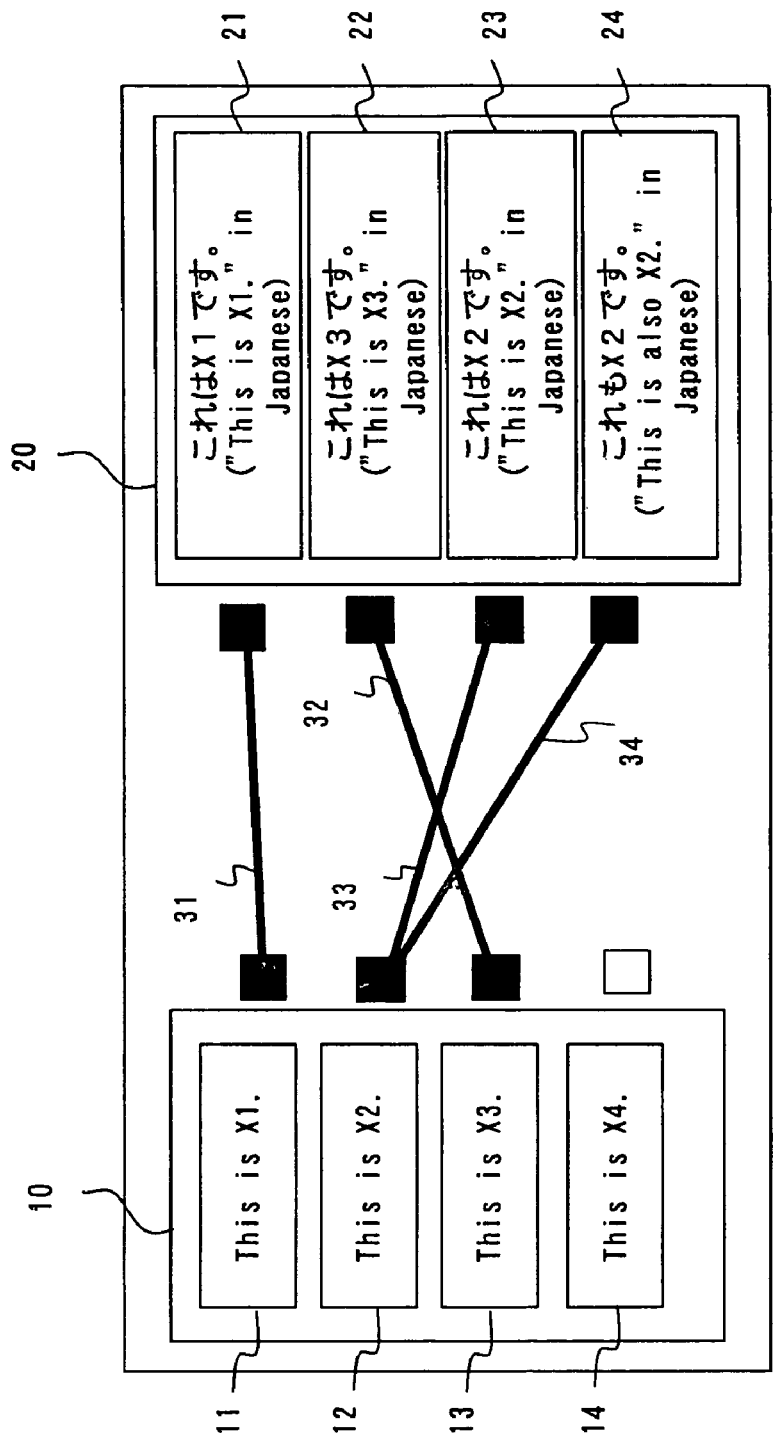
F I G. 1

TRANSLATION CORRELATION DEVICE

CROSS REFERENCE

This is a continuation of a PCT application PCT/JP2003/006869 which was filed on May 30, 2003.

BACKGROUND OF THE INVENTION

1. Field of the Invention

The present invention relates to a method for correlating each segment of an original language document to each segment of its translated language document.

2. Description of the Related Art

With the internationalization of information, a document described in a specific language (for example, English) is frequently translated into another language (for example, Japanese). In such an environment, it often becomes necessary to compare an original document with its translation. Such necessity occurs in a case where a sentence translated by a translation machine is checked, a case where necessary knowledge is extracted for preparing a translation assistance tool from a set of original text and its translated text, and so on. In this case, it is convenient if the correspondence between each segment of an original document and each segment of its translation is shown. In this case, a "segment" means, for example, a "sentence", a "phrase", a "word" or the like composing a document of a natural language, although it is not especially limited.

As a prior art, a method for automatically detecting the correspondence between an original document and its translation for each segment using a computer, and graphically displaying the correspondence is proposed based on such a request (see, for example, Patent document 1).

Patent document 1: Japanese Patent Publication No. H9-179868 (that is, Japanese Patent No. 3311567), FIG. 6.

Products for detecting and displaying such a correspondence have already been sold. As such a product, "Winalign" attached to the "Translator's Workbench" of TRADOS Corporation (http://www.trados.com/) is known.

However, in the prior art, the larger the amount of information of a document to be compared, the lower the accuracy of the correspondence between segments. In addition, when the order of paragraphs differs between an original document and its translation, the accuracy of the correspondence between segments is low. Furthermore, if no segment corresponding to a segment in an original document exists in its translation or if a segment not existing in an original document is added in its translation, its influence widely spreads, thereby degrading the accuracy of the correspondence between segments.

The above-mentioned prior art provides an interface for correcting the incorrect correspondence, when an incorrect correspondence is detected. However, if the accuracy of the correspondence between segments is low, a user must do a lot of correction work.

SUMMARY OF THE INVENTION

It is an object of the present invention to improve accuracy of correlation in each segment of an original document and each segment of its translation.

The translation correlation device of the present invention correlates a plurality of segments composing a first text described in a first language to a plurality of segments composing a second text described in a second language. The translation correlation device comprises a receiving unit for receiving correspondence information indicating that a part of the plurality of segments composing the first text correlates to a part of the plurality of segments composing the second text, a detection unit for detecting the correspondence between other segments of the plurality of segments composing the first text and other segments of the plurality of segments composing the second text and an output unit for outputting information indicating the correspondence detected by the detection unit.

According to the present invention, when detecting the correspondence between a plurality of segments, a part of segments are confirmed in advance. The detection unit detects the correspondence between the other segments. Therefore, the accuracy of a correspondence between segments is improved.

The translation correlation device of the present invention may further comprise a paragraph detection unit for dividing each of the first and second texts into a plurality of paragraphs and detecting the correspondence between a plurality of paragraphs composing the first text and a plurality of paragraphs composing the second text. In this case, the detection unit detects the correspondence between a segment composing the first text and a segment composing the second text for each paragraph.

According to this invention, the correspondence between paragraphs can be detected according to correspondence information. Therefore, even if the order of paragraphs changes when obtaining. the second text from the first text, the correspondence between segments can be correctly made. In addition, since segments are correlated for each paragraph, the number of segments to be compared decreases, thereby improving correspondence accuracy.

The detection unit may detect the correspondence between a segment composing the first text and a segment composing the second text, based on a distance from a segment specified by the correspondence information received by the receiving unit. In this case, when the correspondence indicated by the correspondence information is correct, the accuracy of the correspondence between other segments detected based on the correspondence can be improved.

The translation correlation device of the present invention may further comprise a providing unit for providing candidate information for enabling a user to input the correspondence information. According to the configuration, user's load for specifying correspondence information is reduced.

BRIEF DESCRIPTION OF THE DRAWINGS

FIG. 1 explains a summary of a process for correlating an original document to its translation for each segment.

DESCRIPTION OF THE PREFERRED EMBODIMENTS

Figure 2:
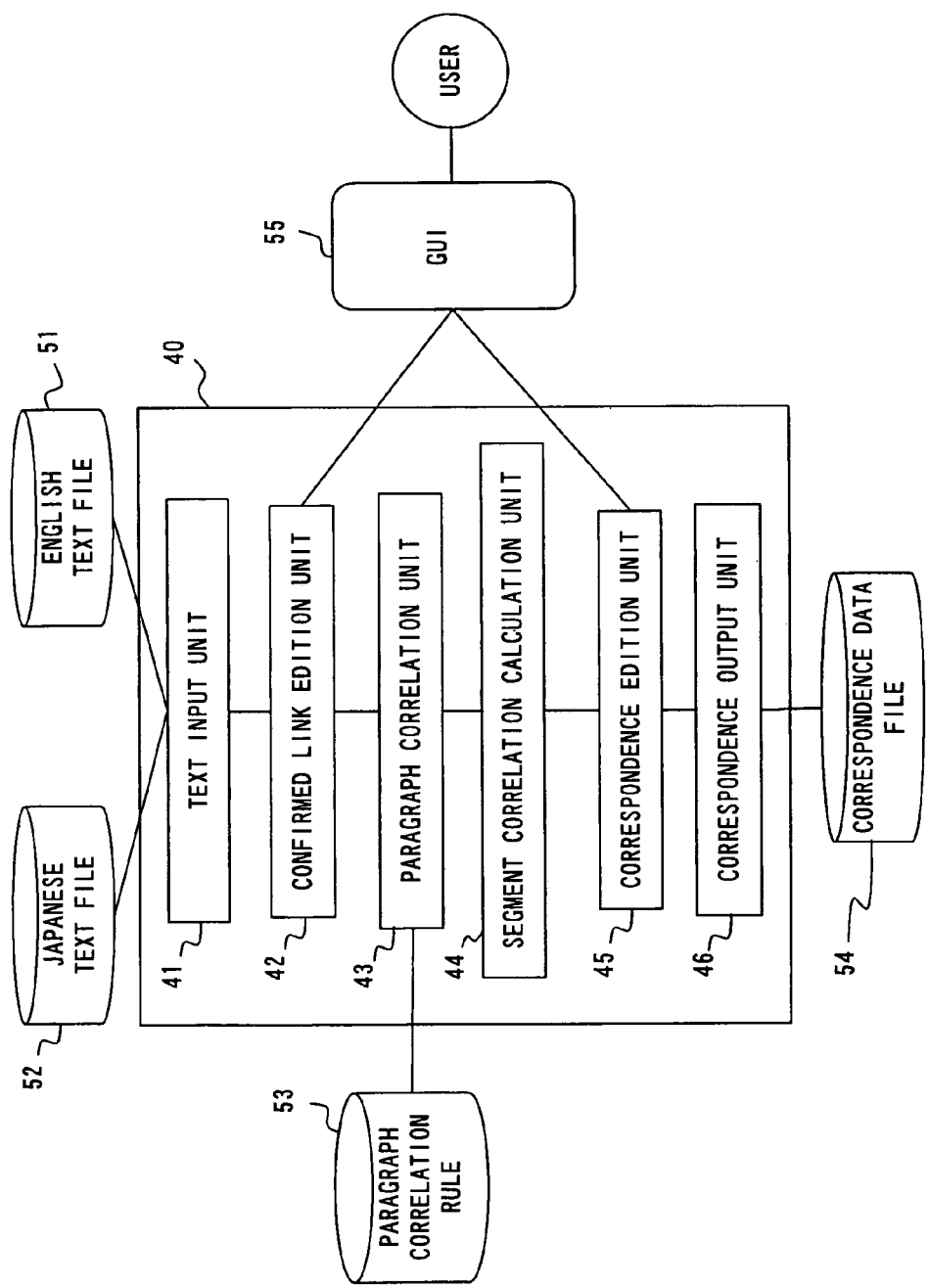
FIG. 2 shows the configuration of translation correlation support system in the embodiment of the present invention.

The preferred embodiments of the present invention are described below.

FIG. 1 explains the summary of the process of correlating an original document to its translation for each segment. FIG. 1 shows an example of the screen provided for a user. In FIG. 1, the correspondence between segments is graphically displayed.

In FIG. 1, a document described in English (hereinafter called a "English text") is displayed in an area 10, and a document described in Japanese (hereinafter called a "Japanese text") is displayed in an area 20. Each of the English and Japanese texts is composed of a plurality of segments. Specifically, the English text is composed of segments 11-14, and the Japanese text is composed of segments 21-24. Although the "segment" means a "sentence" in this example, it is not limited to this. In a case of a natural language, for example, it can also be "word", "phrase", "chapter" or the like. For a method for dividing a document into segments, a publicly known method can be used.

In FIG. 1, the Japanese text displayed in the area 20 is the translation of the English text displayed in the area 10. However, the segments 21-24 are not obtained by sequentially translating the segments 11-14. For example, although the segment 13 appears in the third place in the English text, the segment 22, which is the translation of the segment 13, appears in the second place. Although the segment 23 can be obtained by translating the segment 12 into Japanese, in the Japanese text, the segment 24 similar to the segment 23 exists. In other words, a segment, which has no corresponding segment in the English text, is added in the Japanese text. It can also be interpreted that the two segments 23 and 24 can be obtained by translating the segment 12 into Japanese. Namely, they are correlated 1 to 2. However, it is explained by the former interpretation.

In the correlation process, segments correlated to each other are detected, and the correspondence is graphically displayed. In FIG. 1, it is detected that the segment 11 corresponds to the segment 21 and a link 31 connecting them is displayed. Similarly, a link 32 connecting the segments 12 and 22. is displayed. However, the segments 23 and 24 are similar to each other, and it is assumed that it cannot be determined which of the segments 23 or 24 is the translation result of the segment 12. In this case, a link 33 connecting the segments 12 and 33 and a link 34 connecting the segments 12 and 24 are displayed.

The correlation process may include a process of enabling a user to add/modify a link connecting segments. In this case, the user can add/modify the link using a mouse or the like. In FIG. 1, a user can delete, for example, the link 34. As a result, the correspondence between an original document and its translation can be obtained for each segment.

In this way, in the correlation process, the correspondence between an original document and its translation can be detected and displayed for each segment. Alternatively, it can be assisted so that the correspondence between an original document and its translation can be detected and displayed for each segment.

However, in the conventional method, if the order of segments differs between an original document and its translation or if a sentence which does not exist in one document exists in the other document, correspondence accuracy sometimes degrades. Therefore, the present invention provides a function to solve this problem.

FIG. 2 shows the configuration of translation correlation support system in the embodiment of the present invention. The translation correlation support system 40 is realized by executing a predetermined program using a computer.

A text input unit 41 reads an English text file 51 and a Japanese text file 52. In this case, it is assumed that each of the English and Japanese texts is divided into segments in advance and the English and Japanese texts are stored in the English text file 51 and Japanese text file 52, respectively. However, the text input unit 41 can be provided with a function to divide each of the English and Japanese texts into segments.

The confirmed link edition unit 42 registers a confirmed link specified by a user in a confirmed link information table by interacting with a user via a graphical user interface (GUI) 55. Here, the "confirmed link" indicates the correspondence between segments in a case where the user confirms that a segment in the English text corresponds to a segment in the Japanese text.

Figure 3:
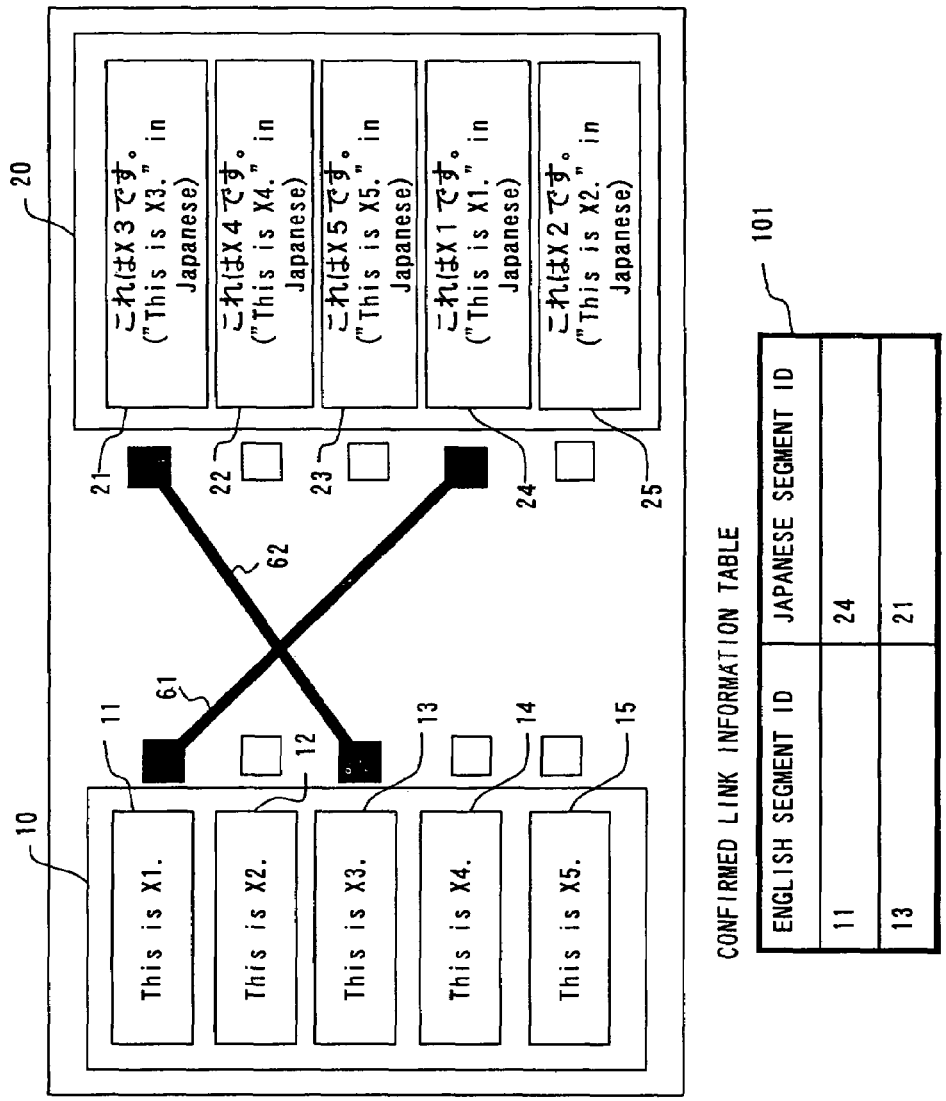
FIG. 3 explains a confirmed link.

FIG. 3 explains a confirmed link. In this case, it is assumed that an English text displayed in the area 10 contains segments 11-15 and a Japanese text displayed in the area 20 contains segments 21-25. The segment numbers 11-25 are used as English segment IDs for identifying each segment composing the English text, and the segments 21-25 are used as Japanese segment IDs for identifying each segment composing the Japanese text. Although the Japanese text is the translation of the English text, the order of segments differs between them.

In this state, it is assumed that the user determines that the segment 11 surely corresponds to the segments 24 and the segment 12 surely corresponds to the segments 21. In this case, the user draws a link for connecting the segments 11 and 24 and a link for connecting the segments 13 and 21, using a mouse or the like.

When recognizing the operation of the user via the graphical user interface 55, the confirmed link edition unit 42 registers two links specified by the user in a confirmed link information table 101 as confirmed links 61 and 62. Specifically, the confirmed link 61 is registered by connecting an English segment ID "ID=11" for identifying the segment 11 with a Japanese segment ID "ID=24" for identifying the segment 24. The confirmed link 62 is registered by connecting an English segment ID "ID=13" for identifying the segment 13 with a Japanese segment ID "ID=21" for identifying the segment 21.

In this way, the confirmed link edition unit 42 receives correspondence information indicating one or a plurality of confirmed links specified by the user and registers the confirmed link(s) in the confirmed link information table 101.

The paragraph correlation unit 43 divides each of the English and Japanese texts into a plurality of paragraphs, based on the confirmed links specified by the user. Then, the paragraph correlation unit 43 correlates the paragraphs of the English text to the paragraphs of the Japanese text. In this case, the paragraph correlation unit 43 performs the division and correlation processes according to a paragraph correlation rule 53 which has been prepared in advance.

Figure 4:
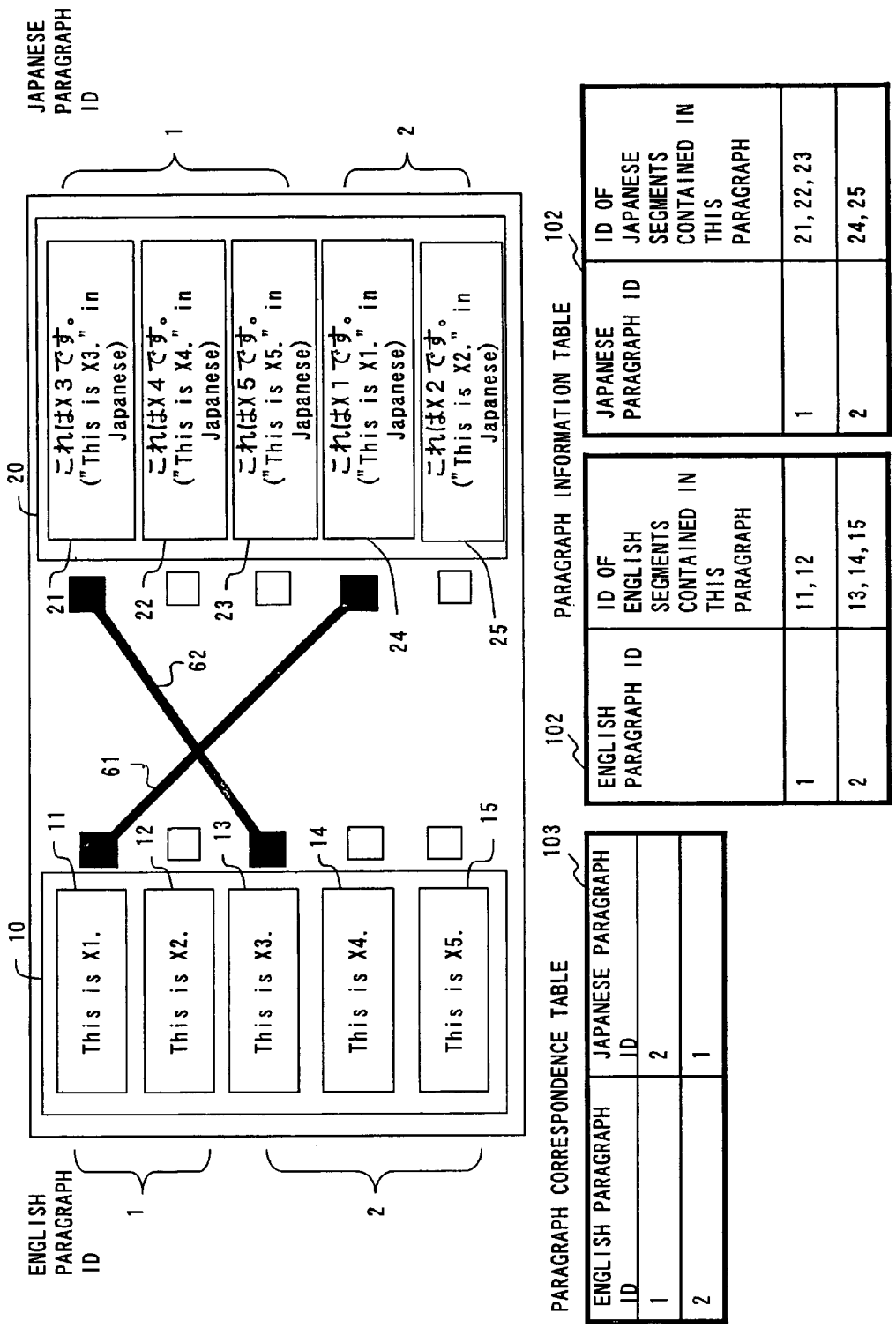
FIG. 4 explains the correspondence between paragraphs.

FIG. 4 explains the correspondence between paragraphs. In this case, it is assumed that the confirmed links 61 and 62 are registered in the procedure described with reference to FIG. 3.

The paragraph correlation unit 43, firstly, divides each of the English and Japanese texts using the confirmed links. For example, In the English text, the confirmed links 61 and 62 are connected to the segments 11 and 13, respectively. In this case, firstly, the segment 11 to which the confirmed link 61 is connected is extracted. Then one or plurality of segment (s) located between the segment 11 to which the confirmed link 61 is connected and the segment 13 to which the next confirmed link 62 is connected is extracted for a paragraph containing the segment 11. As a result, the segments 11 and 12 are extracted as segments belonging to a specific paragraph. Similarly, segments 13 through 15 are extracted as segments belonging to another paragraph. In the Japanese text, the segments 21 through 23 are extracted as segments belonging to one paragraph, and the segments 24 and 25 are extracted as segments belonging to another paragraph. Then, these extracted results are registered in a paragraph information table 102.

Then, the paragraph correlation unit 43 detects the correspondence between paragraphs. Specifically, paragraphs connected by a confirmed link are correlated In FIG. 4, since. the segments 11 and 24 are connected by the confirmed link 61, a paragraph containing the segment 11 and a paragraph containing the segment 24 are correlated. Similarly, a paragraph containing the segment 13 and a paragraph containing the segment 21 are correlated. Then, this result is registered in a paragraph correspondence table 103, using English paragraph IDs and Japanese paragraph IDs.

In this way, the paragraph correlation unit 43 divides each text into a plurality of paragraphs and correlates the plurality of paragraphs based on a confirmed link specified by the user.

Each confirmed link basically connects one specific segment in the English text and one specific segment in the Japanese text. Therefore, if order of segments is not changed during translation, the correspondence between paragraphs becomes as shown in FIG. 5A. If the order of segments is changed during translation, the correspondence between paragraphs becomes as shown in FIG. 5B.

Figure 5C:
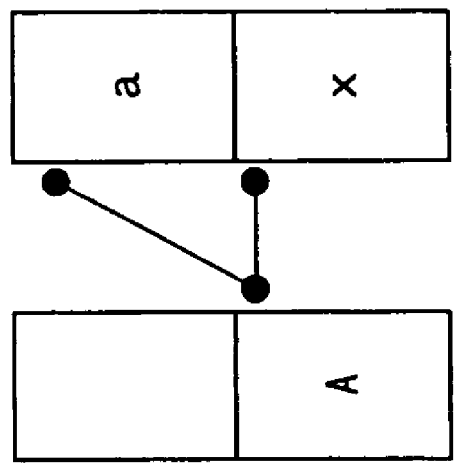
FIGS. 5A through 5C show example of paragraph correspondence.
Figure 5B:
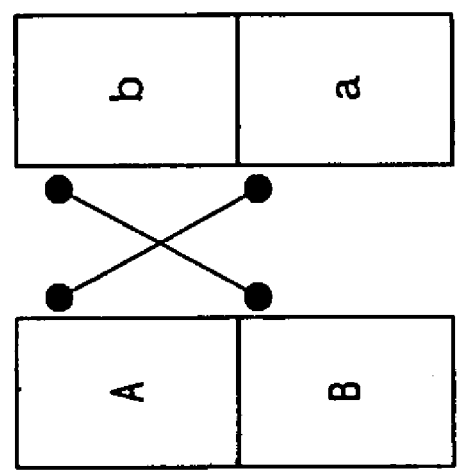
Figure 5A:
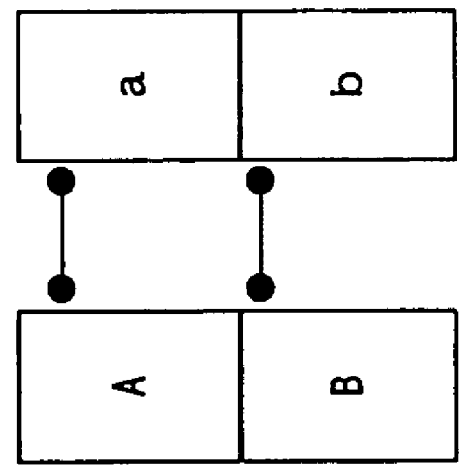

However, if a certain segment is connected to a plurality of segments by a plurality of confirmed links for some reason, one paragraph is correlated to a plurality of paragraphs, as shown in FIG. 5C. In an example shown in FIG. 5C, paragraph A is correlated to both of paragraphs a and paragraph x. In this case, the paragraph correlation unit 43, for example, selects a paragraph that appears in a text in the first place, from the plurality of paragraphs. As a result, the paragraph A is correlated to the paragraph a in FIG. 5C.

The segment correlation calculation unit 44 correlates a plurality of segments composing the English text to a plurality of segments composing the Japanese text, using the correspondence between paragraphs generated by the paragraph correlation unit 43. Specifically, segments are correlated for each paragraph. Although a method for correlating each segment between original document and its translation is not especially limited, for example, "A Program for Aligning Sentences in Bilingual Corpora" (by Gale & Church 1993) is famous. This paper can be obtained from the following site. http://citeseer.nj.nec.com/gale93program.html An example of the operation of the segment correlation calculation unit 44 is described below. In this case, it is assumed that the confirmed links 61 and 62 shown in FIG. 3 are specified by the user, and then the paragraph information table 102 and the paragraph correspondence table 103 is generated by the paragraph correlation unit 43.

In this case, the segment correlation calculation unit 44, for example, firstly correlates each segment belonging to an English paragraph 1. Here, the English paragraph 1 corresponds to a Japanese paragraph 2. Therefore, the correspondence between the segments 11 and 12 belonging to the English paragraph 1 and the segments 24 and 25 belonging to the Japanese paragraph 2 is checked.

The segment 11 is connected to the segment 24 by the confirmed link 61. Therefore, the segment 11 is correlated to the segment 24. The segment 12 is correlated to a segment other than the segment 24 among segments belonging to the Japanese paragraph 2. As a result, the segment 12 is correlated to the segment 25.

Then, the segment correlation calculation unit 44 correlates each segment belonging to an English paragraph 2. The English paragraph 2 corresponds to a Japanese paragraph 1. Therefore, the correspondence between the segments 13 through 15 belonging to the English paragraph 2 and the segments 21 through 23 belonging to the Japanese paragraph 1 is checked.

The segment 13 is connected to the segment 21 by the confirmed link 62. Therefore, the segment 13 is correlated to the segment 21. The segments 14 and 15 are correlated to segments other than the segment 21 (that is, segments 22 and 23) among segments belonging to the Japanese paragraph 1. In this case, the correspondence between the segments 14, 15 and the segments 22, 23 are calculated, for example, by the above-mentioned Gale & Church method. In the following description, it is assumed that the segment 14 is correlated to the segment 22, and the segment 14 is correlated to the segment 23.

As a result, the segments 11, 12, 13, 14 and 15 contained in the English text are respectively correlated to the segments 24, 25, 21, 22 and 23 contained in the Japanese text.

Figure 6:
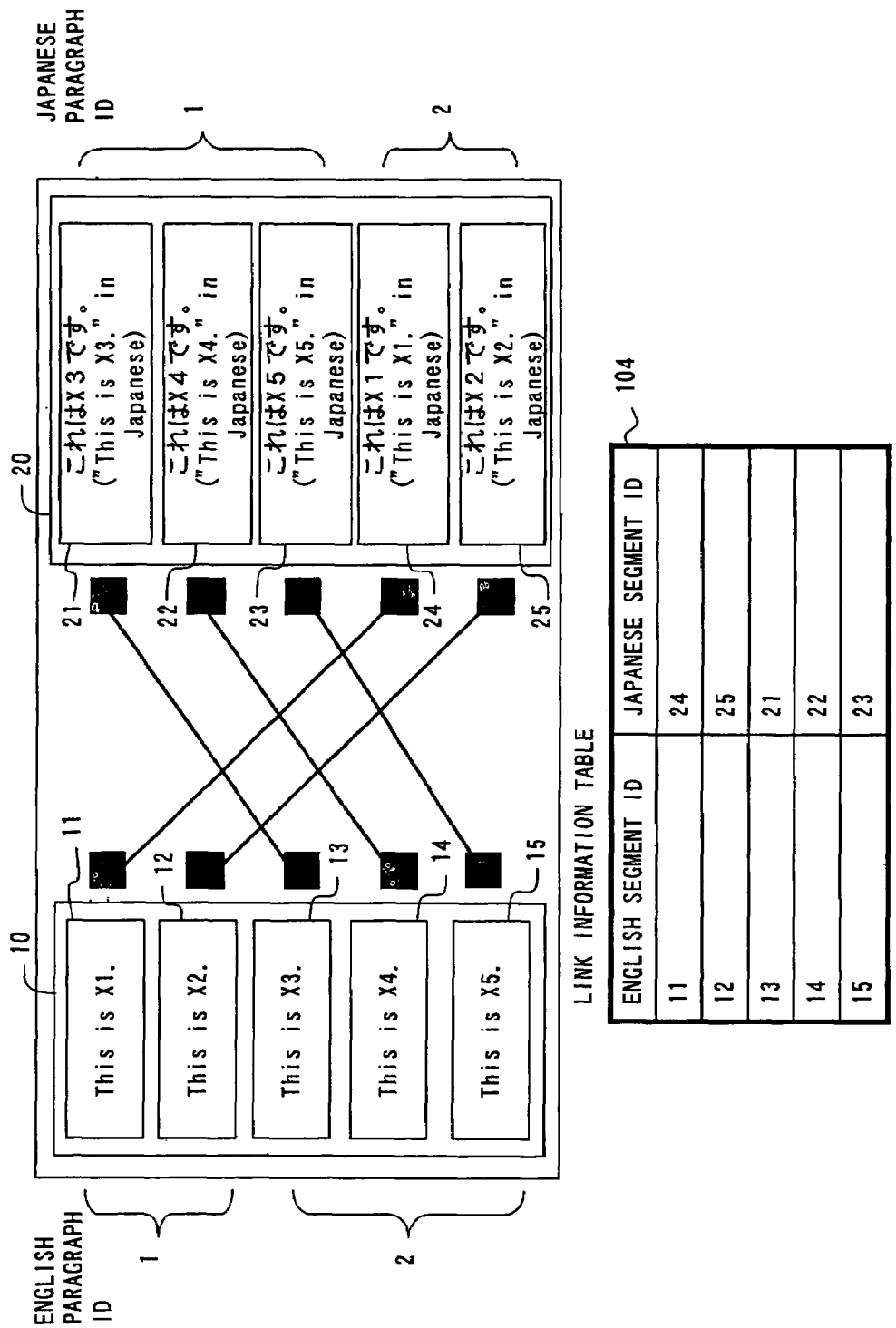
FIG. 6 shows the result of the process of a segment correlation calculation unit.

FIG. 6 shows the result of the process of the segment correlation calculation unit 44. The correspondence between segments, obtained by the segment correlation calculation unit 44, is registered in a link information table 104. At this time, a confirmed link specified by the user is also registered in the link information table 104. The correspondence between segments is displayed by the correspondence edition unit 45 via the graphical user interface 55.

The correspondence edition unit 45 displays the correspondence between segments obtained by the segment correlation calculation unit 44, and edits the correspondence according to an instruction from the user. In this case, the "instruction from the user" includes an instruction to add, delete and modify a link connecting segments. The "edition of the correlation" includes the process of updating the link information table 104 shown in FIG. 6 according to the instruction from the user and the process of drawing a link according to the updated link information table 104. The user inputs an instruction to add, delete or modify a link using a mouse or the like.

A correspondence output unit 46 outputs information indicating the correspondence between segments obtained by the segment correlation calculation unit 44 (in a case where it is edited by the correspondence edition unit 45, information indicating the correspondence after the edition) to a correspondence data file 54. In this case, a file format is not especially limited.

Figure 7:
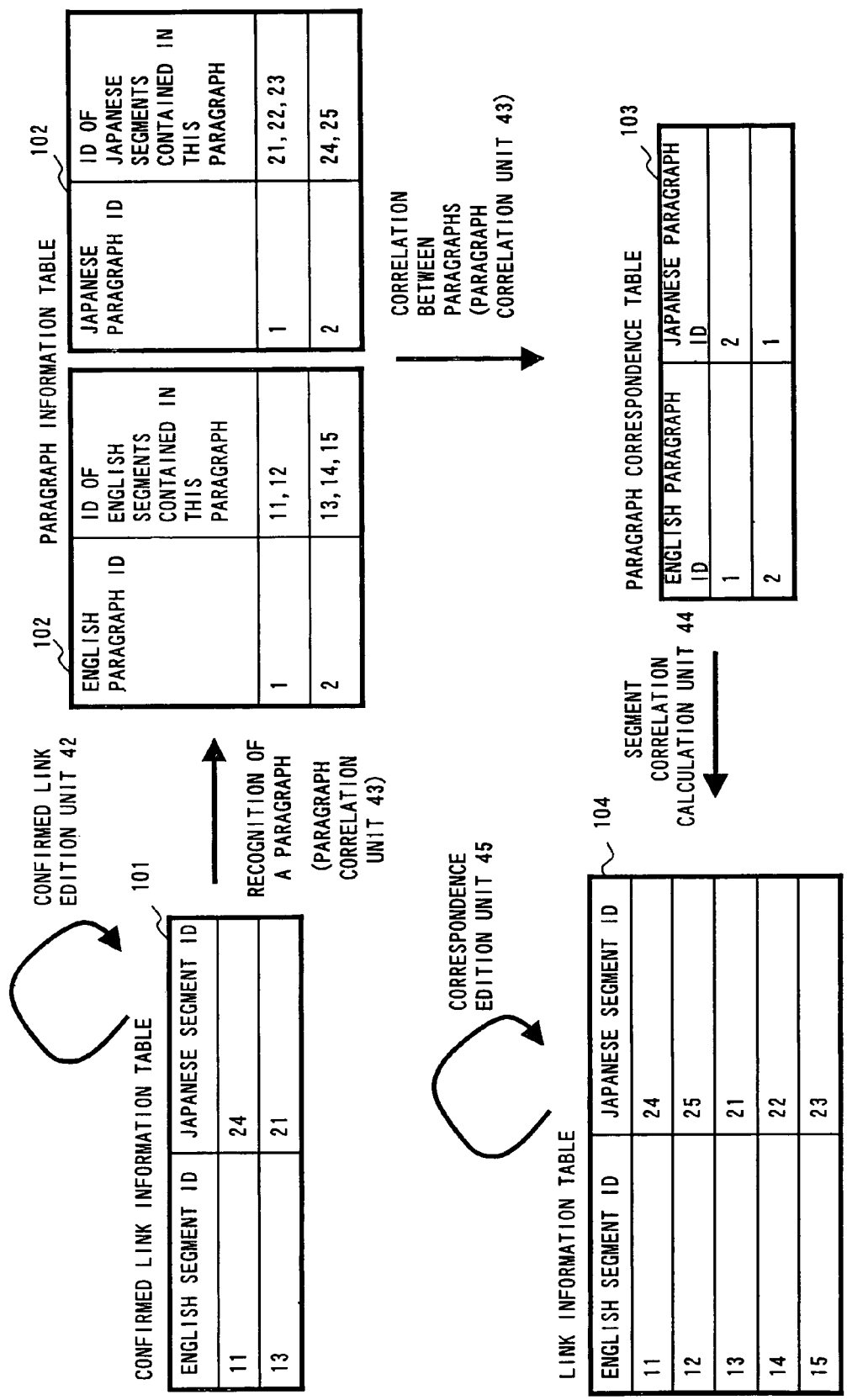
FIG. 7 shows the flow of the operation of the translation correlation support system of the embodiment.

FIG. 7 shows the flow of the operation of the translation correlation support system of the embodiment. The translation correlation support system correlates segments in the following sequence.

Firstly, the confirmed link edition unit 42 provides a form for specifying a confirmed link to the user via the graphical user interface 55. When the user specifies a confirmed link, the confirmed link edition unit 42 registers the specified confirmed link in the confirmed link information table 101.

Then, the paragraph correlation unit 43 divides each of the English and Japanese texts into a plurality of paragraphs based on the confirmed link specified by the user. Then, the paragraph correlation unit 43 detects segments belonging to each paragraph and registers their correspondence in the paragraph information table 102.

The paragraph correlation unit 43 also detects the correspondence between the plurality of English paragraphs and the plurality of Japanese paragraphs using confirmed links specified by the user. Then, the paragraph correlation unit 43 registers their correspondence in the paragraph correspondence table 103.

Then, the segment correlation calculation unit 44 refers to the paragraph correspondence table 103 and correlates segments for each paragraph. Then, the correspondence between segments is registered in the link information table 104.

The correspondence edition unit 45 provides the correspondence between segments detected by the segment correlation calculation unit 44 to the user via the graphical user interface 55. In this case, if the user instructs to add, delete or modify a link connecting segments, the correspondence edition unit 45 updates the link information table 104 according to the instruction. Then, the contents of the link information table 104 are outputted to the correspondence data file 54.

In this way, in the translation correlation support system of the embodiment, the user specifies a confirmed link and segments are correlated using the confirmed link. Therefore, accuracy of correlation between segments is improved. After each text is divided into a plurality of paragraphs according to the confirmed link and paragraphs are correlated using the confirmed links, segments are correlated for each paragraph. Therefore, even if the order of paragraphs changes when generating the translation of the original document, each segment contained in the original document can be accurately correlated to each segment contained in its translation.

Next, the operation of the translation correlation support system of the embodiment is described with reference to a flowchart.

Figure 8:
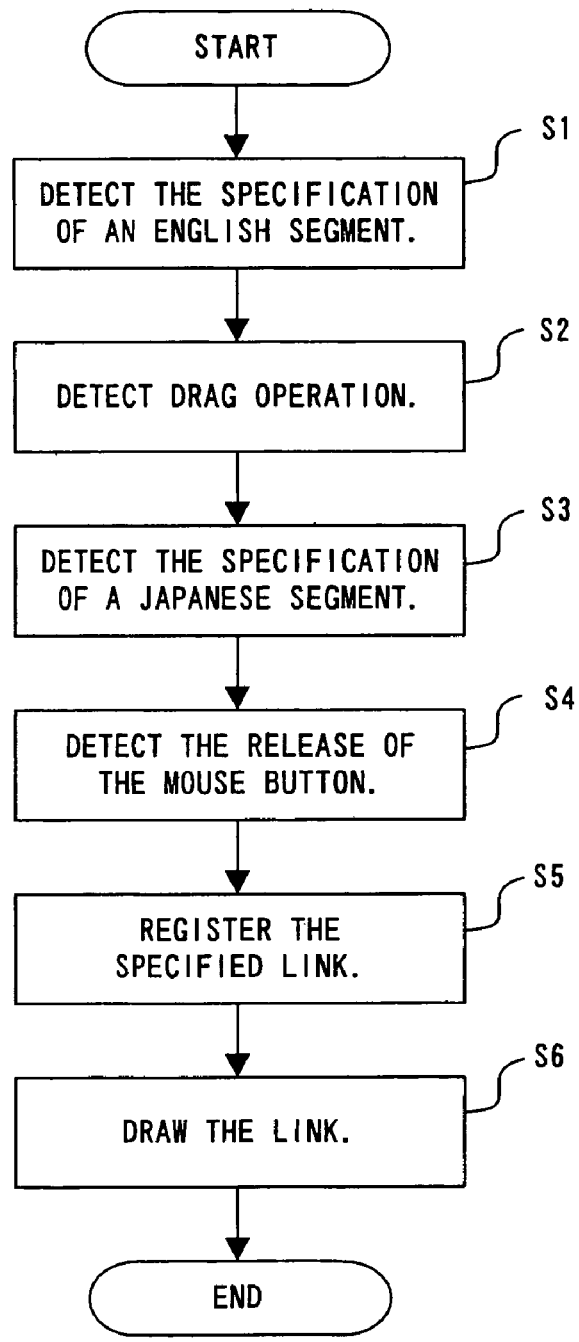
FIG. 8 is a flowchart showing the operation of a confirmed link edition unit.

FIG. 8 is a flowchart showing the operation of the confirmed link edition unit 42. In FIG. 8, the user specifies a new confirmed link using the graphical user interface 55. In this case, the user specifies a confirmed link by drawing a line from a specific English segment to a specific Japanese segment using a mouse on the graphical user interface 55.

In step S1, an English segment specified by the mouse is detected. In step S2, a dragging operation by the mouse is detected. Specifically, it is detected that a mouse cursor is shifted while the left-hand side button is being pressed. In step S3, a Japanese segment specified by the mouse pointer is detected. In step S4, it is detected that the left-hand side button of the mouse is released.

In step S5, a confirmed link specified by the user is registered. Specifically, the English segment detected in step S1 and the Japanese segment detected in step S3 are registered in the confirmed link table 101.

When the user deletes a confirmed link, a corresponding record is deleted from the confirmed link information table 101 according to the instruction of the user. A flowchart of this operation is omitted.

Figure 9:
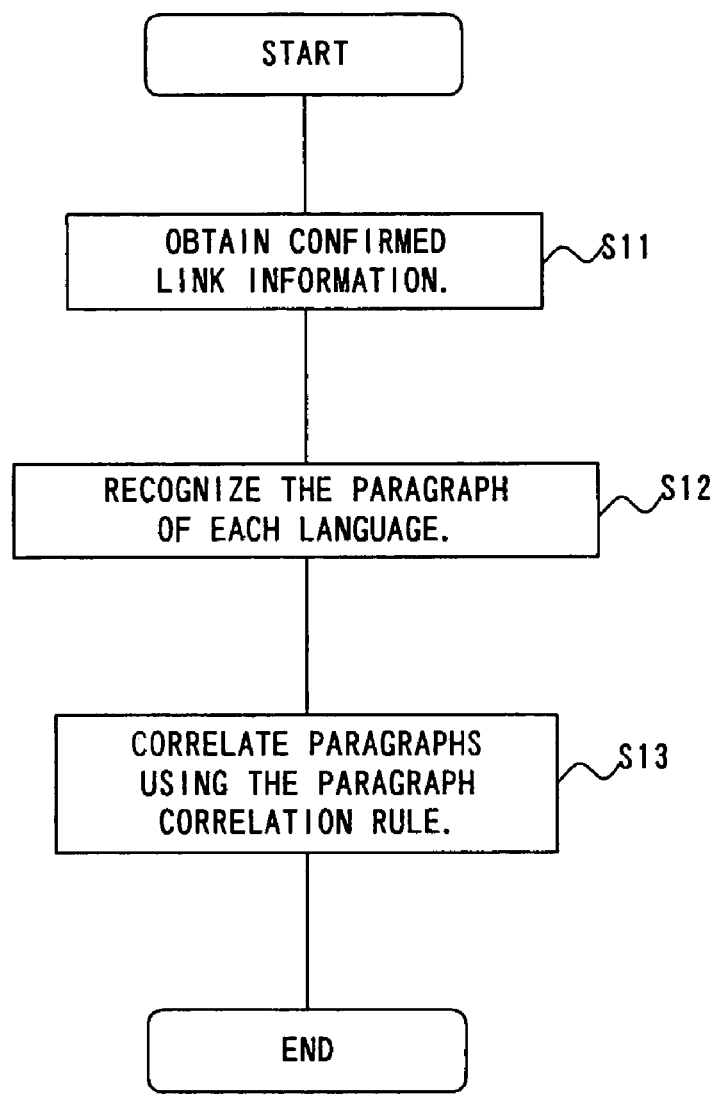
FIG. 9 is a flowchart showing the operation of a paragraph correlation unit.

FIG. 9 is a flowchart showing the operation of the paragraph correlation unit 43. This process is performed after the user specifies a confirmed link.

In step S11, confirmed link information is obtained from the confirmed link information table 101. Specifically, a confirmed link specified by the user is recognized. In step S12, each of the English and Japanese texts is divided into a plurality of paragraphs according to the confirmed link. These paragraphs are registered in the paragraph information table 102. The method for dividing each text into a plurality of paragraphs can be realized, for example, by the procedure described with reference to FIG. 4.

In step S13, the plurality of English paragraphs and the plurality of Japanese paragraphs are correlated according to the paragraph correlation rule 53. As the paragraph correlation rule 53, the procedure of correlating paragraphs using a confirmed link is used, as described with reference to FIG. 4.

Figure 10:
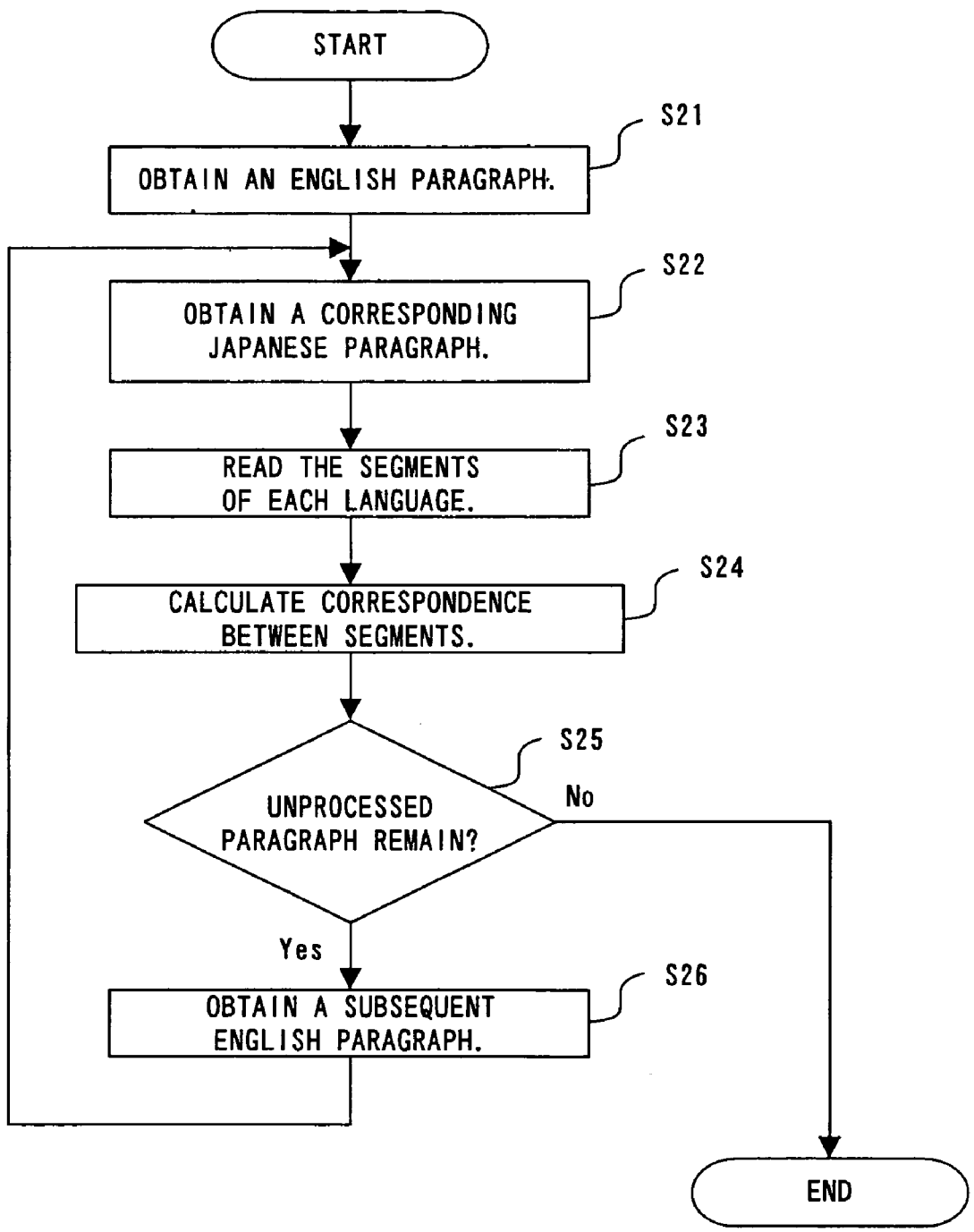
FIG. 10 is a flowchart showing the operation of a segment correlation calculation unit.

FIG. 10 is a flowchart showing the operation of the segment correlation calculation unit 44. This process is performed after paragraph correlation by the paragraph correlation unit 43 is completed.

In step S21, one English paragraph is selected from the paragraph information table 102. In step S22, the paragraph correspondence table 103 is referenced, and a Japanese paragraph corresponding to the English paragraph selected in step S21 is obtained. In step S23, segments belonging to the paragraphs selected in steps S21 and S22 are read. Then, in step S24, the correspondence between the segments read in step S23 is detected.

In step S25, it is checked whether there remain unselected English paragraphs. If there remain unselected paragraphs, in step S26, one paragraph is selected from the unselected English paragraphs, and the process returns to step S22. After all the English paragraphs are selected, the process terminates.

Figure 11:
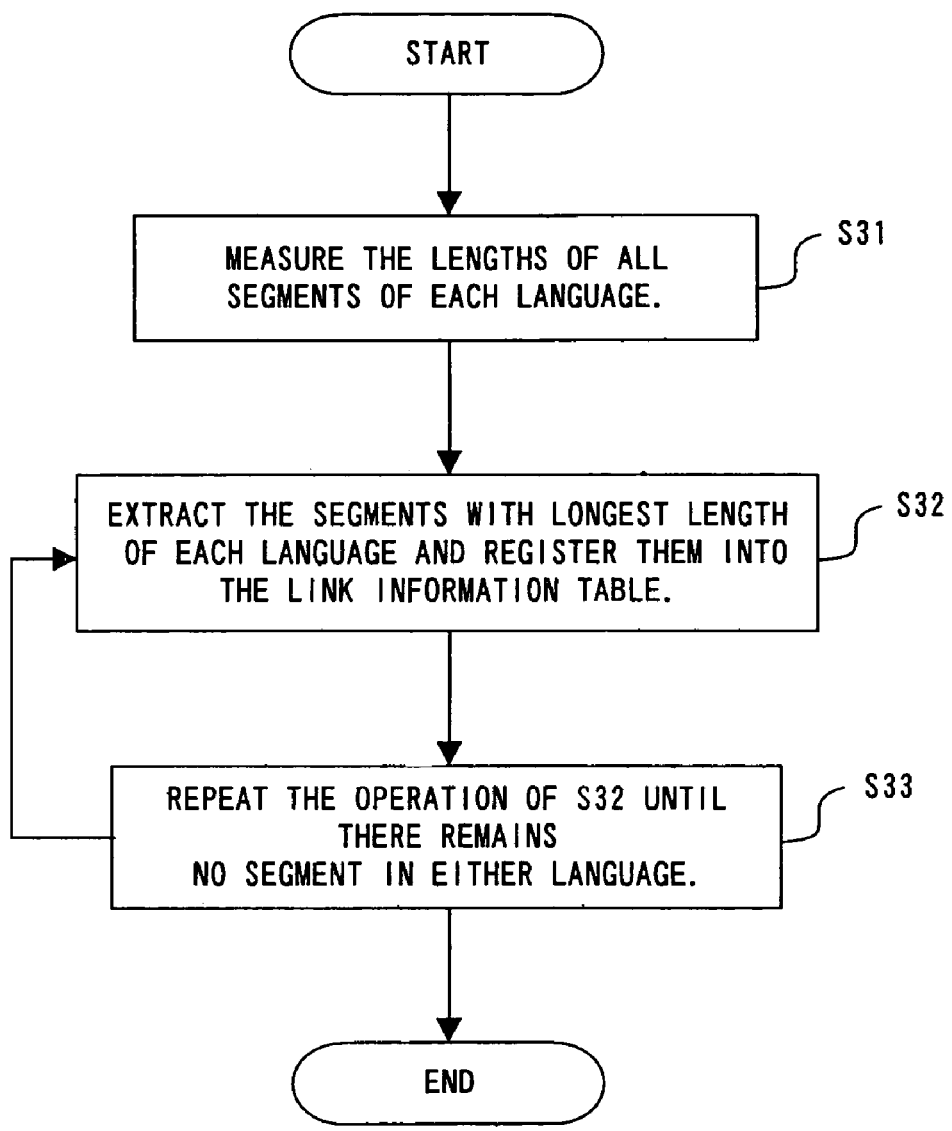
FIG. 11 is a flowchart showing an example of the process of detecting the correspondence between segments.

FIG. 11 is a flowchart showing an example of the process of detecting the correspondence between segments. The process shown in this flowchart corresponds to the process in step S24 of FIG. 10. Specifically, the process shown in this flowchart is performed for each paragraph.

In step S31, the length of each segment belonging to the selected English paragraph and the length of each segment belonging to its corresponding Japanese paragraph are checked. In this case, the segment length is determined, for example, by the number of words or the number of characters. In step S32, the longest segment is extracted from each of the English and Japanese paragraphs, and the extracted segments are registered in the link information table 104 as a pair of corresponding segments.

In step S33, the process in step S32 is repeated until no segment remains in the paragraph in either language. Specifically, segments are sequentially extracted in descending order of length from both of the English and Japanese paragraphs, and are sequentially registered in the link information table 104 as pairs of corresponding segments.

In this way, correspondences between segments are registered in the link information table 104 for each paragraph. Therefore, applying the same process to each paragraph, correspondences between segments can be registered in the link information table 104 across entire text.

Figure 12:
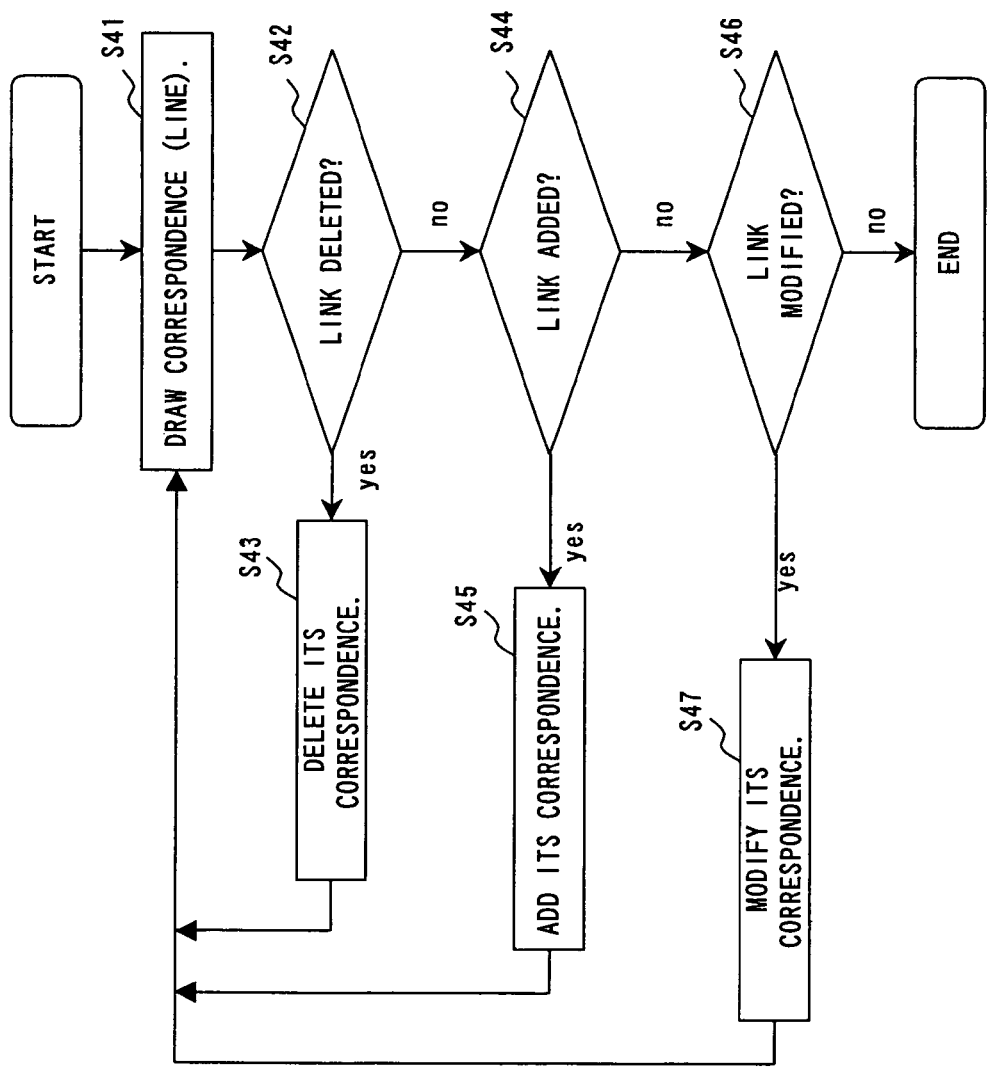
FIG. 12 is a flowchart showing the operation of a correspondence edition unit.

FIG. 12 is a flowchart showing the operation of the correspondence edition unit 45. This process is performed after the segment correlation calculation unit 44 registers the correspondences between segments in the link information table 104.

In step S41, the correspondence registered in the link information table 104 is drawn. Specifically, a link connecting the segments is drawn. Then, it is awaited that a user's instruction is inputted via the graphical user interface 55.

If an instruction to delete a link is detected in step S42, a correspondence represented by the link is deleted from the link information table 104 in step S43. If an instruction to add a link is detected in step S44, a correspondence represented by the link is added to the link information table 104 in step S45. If an instruction to modify a link is detected in step S46, the contents of the link information table 104 is updated according to the instruction in step S47.

The user operations of deleting, adding and modifying a link are basically the same as those of deleting, adding and modifying a confirmed link, respectively. For example, the operation of the correspondence edition unit 45 in the case where the user adds a link is basically the same as that of the confirmed link edition unit 42 shown in FIG. 8. However, although the confirmed link edition unit 42 registers a confirmed link specified by the user in the confirmed link information table 101, the correspondence edition unit 45 registers a link specified by the user in the link information table 104.

When the link information table 104 is updated in step S43, 45 or 47, the process returns to step S41, and the modified contents of the link information table 104 is drawn via the graphical user interface 55.

Figure 13:
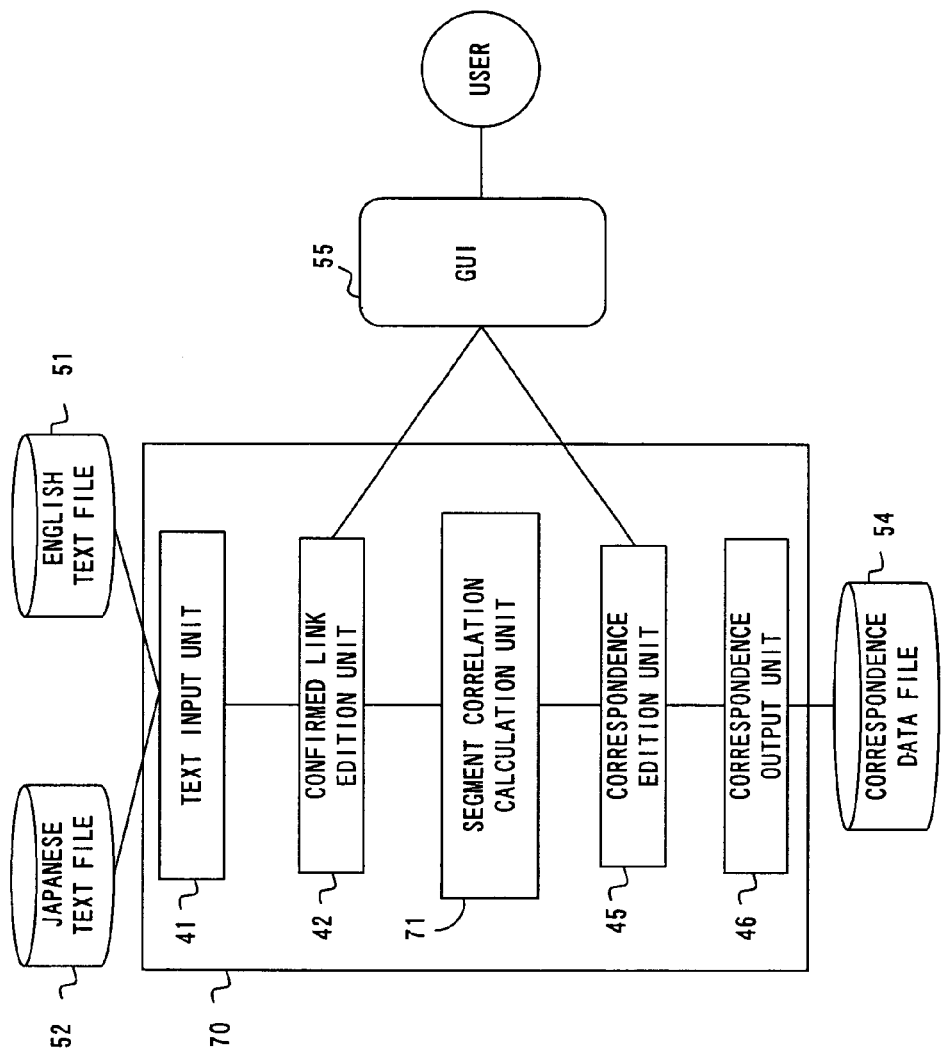
FIG. 13 shows the configuration of the translation correlation support system in another embodiment of the present invention (No. 1).

FIG. 13 shows the configuration of the translation correlation support system in another embodiment of the present invention. The basic configuration of the translation correlation support system 70 shown in FIG. 13 is the same as that of the translation correlation support system 40 shown in FIG. 2. The translation correlation support system 40 comprises a paragraph correlation unit 43, and the segment correlation calculation unit 44 detects a correspondence between segments for each paragraph. However, the translation correlation support system 70 comprises no paragraph correlating unit 43, and the segment correlation calculation unit 71 detects a correspondence between segments without taking a paragraph into consideration.

Figure 14:
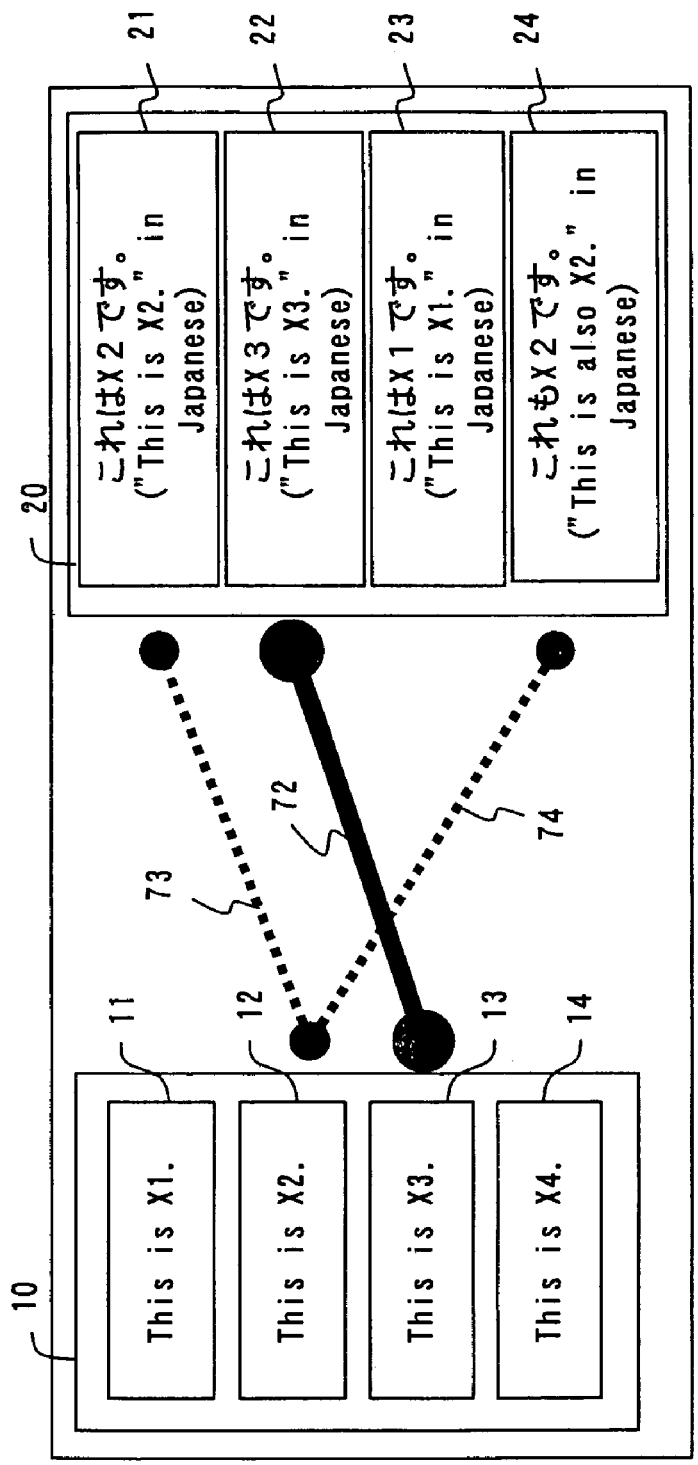
FIG. 14 explains the operation of the segment correlation calculation unit.

FIG. 14 explains the operation of the segment correlation calculation unit 71. In this case, it is assumed that the user has already specified a confirmed link connecting segments 13 and 22. Segments 21 and 24 have been already obtained as segment candidates to be obtained by translating segment 12 by a public known method. As a result, two candidate links 73 and 74 are already generated.

In this case, the segment correlation calculation unit 71 determines the most likely link based on a distance between a confirmed link and each candidate link. Here, the distance can be, for example, calculated by the number of lines between segments. For example, the distance between the confirmed link 72 and a candidate link 73 is "2", since the distance between segments 13 and 12 is "1" in the English text, and the distance between segments 22 and 21 is "1" in the Japanese text. On the other hand, the distance between the confirmed link 72 and a candidate link 74 is "3", since the distance between segments 13 and 12 is "1" in the English text, and the distance between segments 22 and 24 is "2" in the Japanese text. In this case, since the candidate link 73 is closer to the confirmed link 72 than the candidate link 73, the candidate link 73 is selected as the most likely link. In other words, the segment 12 is correlated to the segment 21.

When detecting the correspondence between segments as described above, the segment correlation calculation unit 71 registers the correspondence in the link information table 104.

Figure 15:
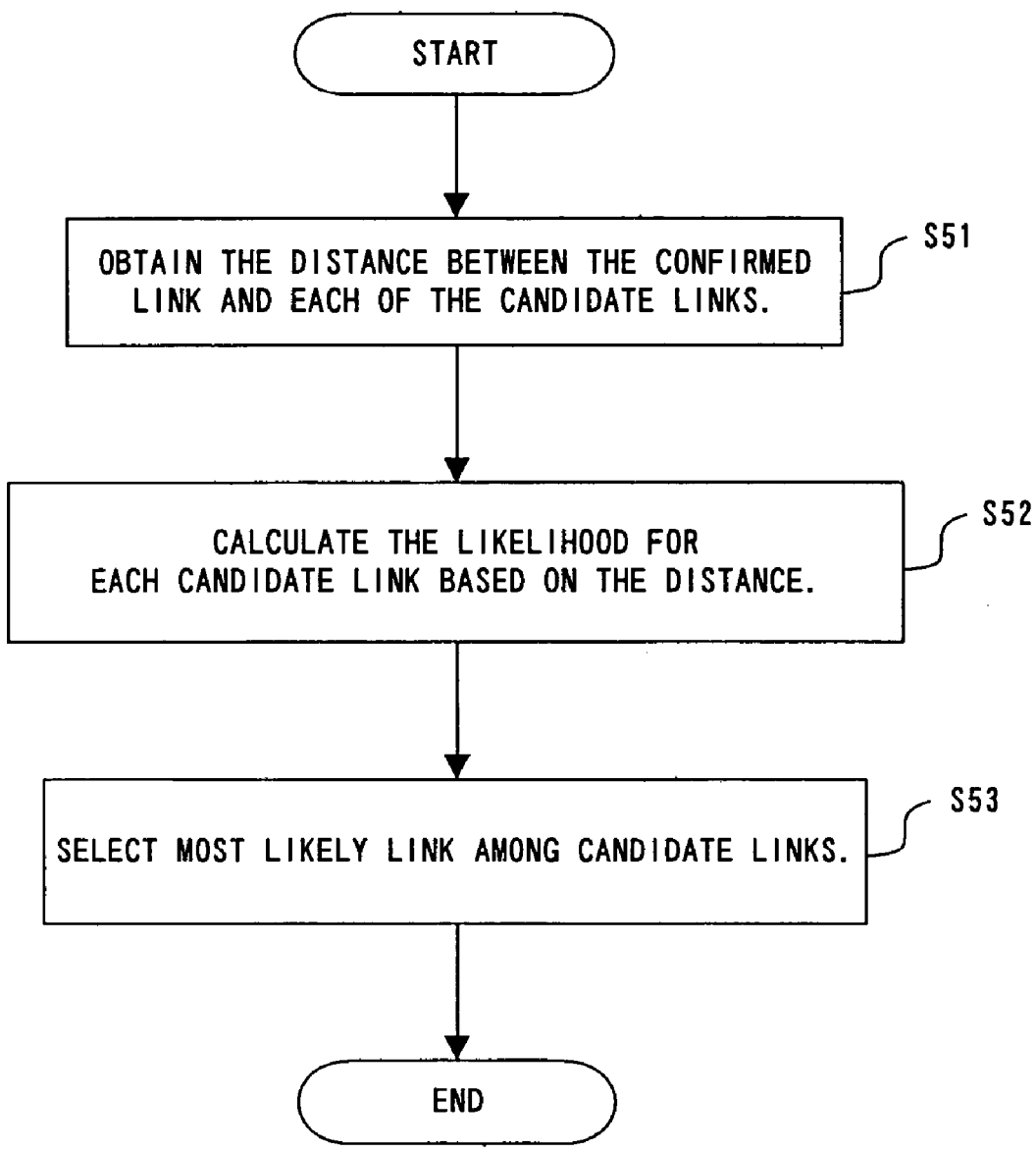
FIG. 15 is a flowchart showing the operation of the segment correlation calculation unit.

FIG. 15 is a flowchart showing the operation of the segment correlation calculation unit 71. This process shown in this flowchart is performed when a plurality of candidate links are generated for a segment. This process is also performed for each segment in which a plurality of candidate links are generated.

In step S51, the distance between a confirmed link and each of candidate links is calculated. In step S52, the likelihood for each candidate link is calculated based on the calculated distance. In this case, it is considered that the shorter the distance with from the confirmed link, the higher the likelihood. In step S53, the likely link is selected from the competing candidate links. Then, the link selected in step S53 is registered in the link information table 104.

In this way, according to the translation correlation support system 70 shown in FIG. 13, when a plurality of candidates exist as Japanese segments corresponding to one specific English segment, a plurality of candidate links connecting the English segment with each of the Japanese segments is generated, and the most likely candidate link is selected based on the distance between the confirmed link specified by the user and each candidate link. Then, segments are correlated according to the selected candidate link. Therefore, if a correspondence by a confirmed link is correct, the accuracy of the correspondence between segments is improved.

Figure 16:
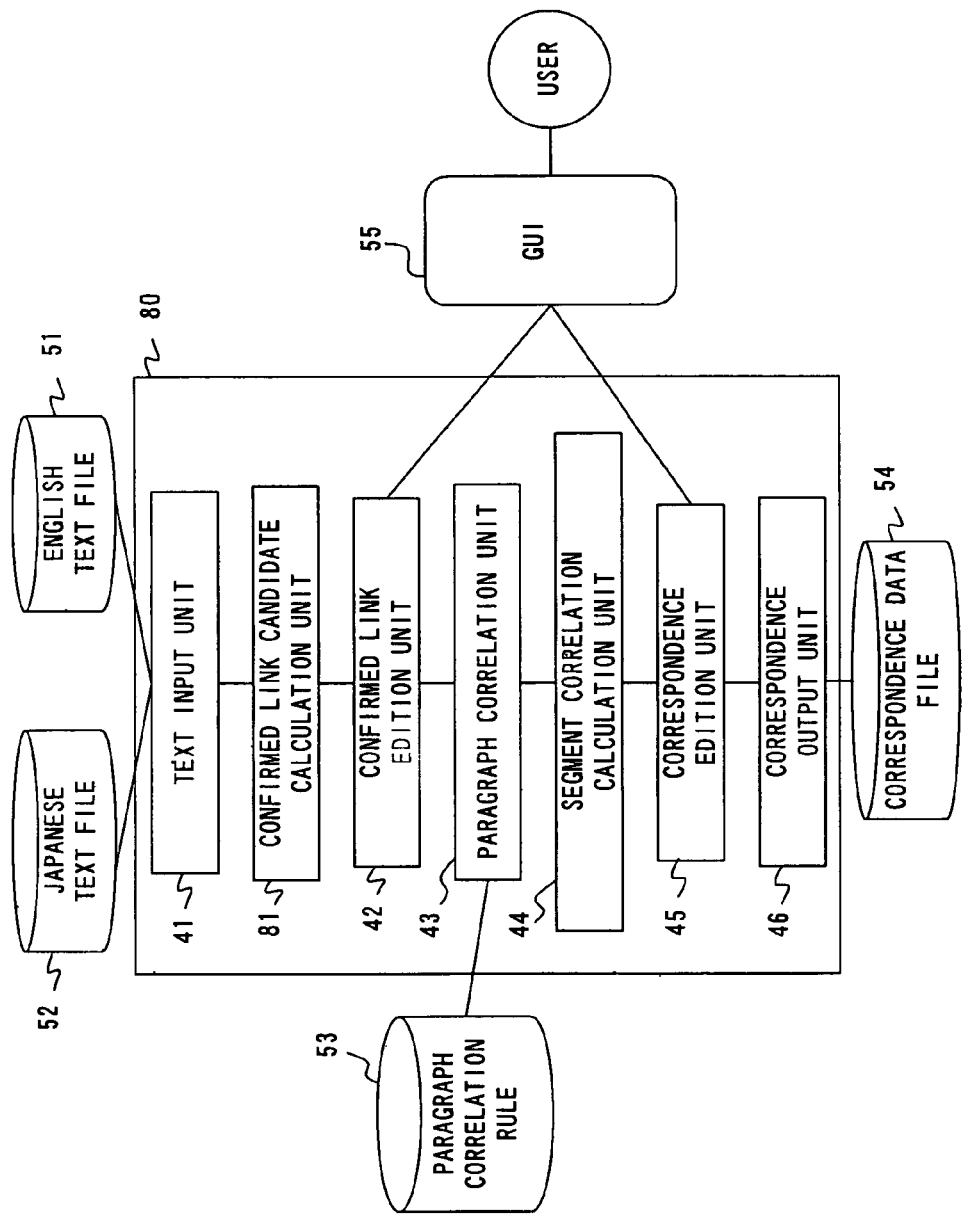
FIG. 16 shows the configuration of the translation correlation support system in another embodiment of the present invention (No. 2).

FIG. 16 shows the configuration of the translation correlation support system in another embodiment of the present invention. The basic configuration of the translation correlation support system 80 shown in FIG. 16 is the same as that of the translation correlation support system 40 shown in FIG. 2. However, the translation correlation support system 80 further comprises a confirmed link candidate calculation unit 81, and can provide a candidate of a confirmed link to the user. In this case, the user can specify a confirmed link while referring to confirmed link candidates provided by the confirmed link candidate calculation unit 81. The process after the user specifies a confirmed link among the confirmed link candidates is basically the same as that of the translation correlation support system 40 shown in FIG. 2.

Figure 17:
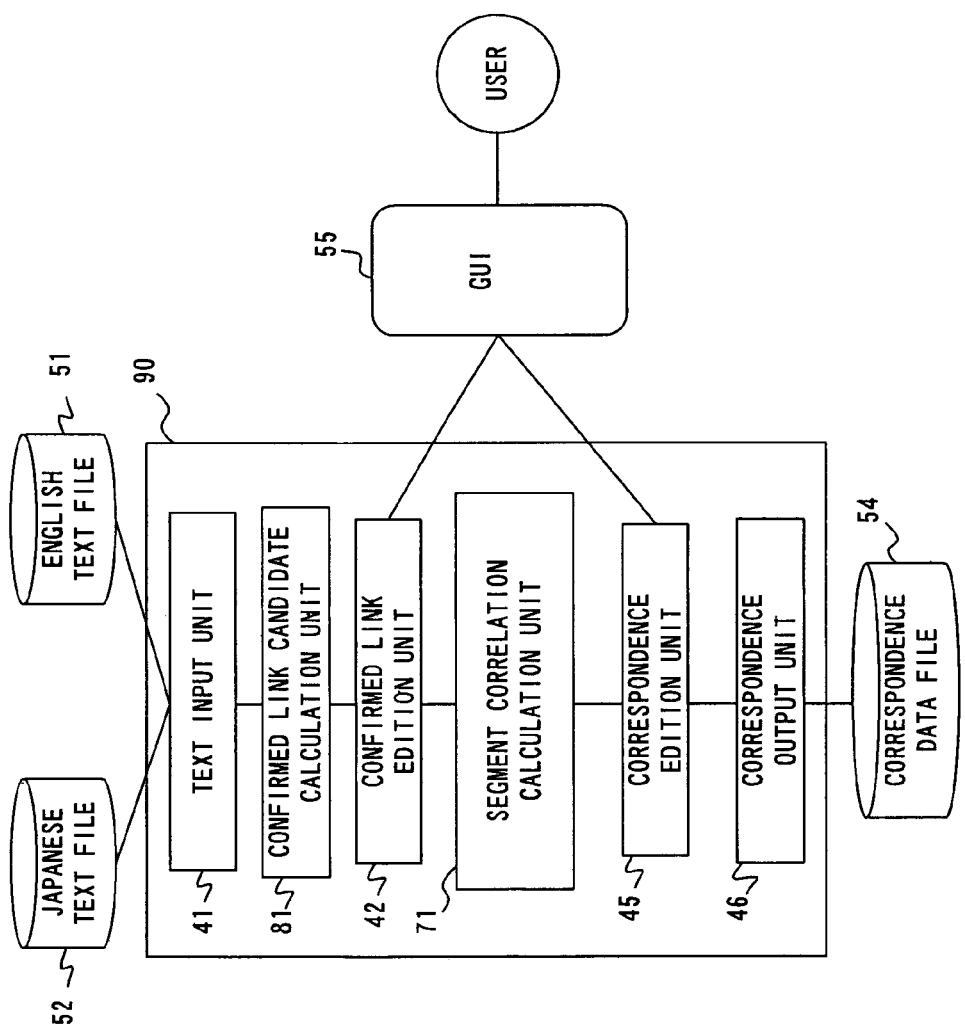
FIG. 17 shows the configuration of the translation correlation support system in another embodiment of the present invention (No. 3).

FIG. 17 shows the configuration of the translation correlation support system in another embodiment of the present invention. The basic configuration of the translation correlation support system 90 shown in FIG. 17 is the same as that of the translation correlation support system 70, shown in FIG. 13. However, the translation correlation support system 90 also comprises a confirmed link candidate calculation unit 81 like the translation correlation support system 80 shown in FIG. 16, and provides a confirmed link candidate to the user.

Figures 18A, 18B:
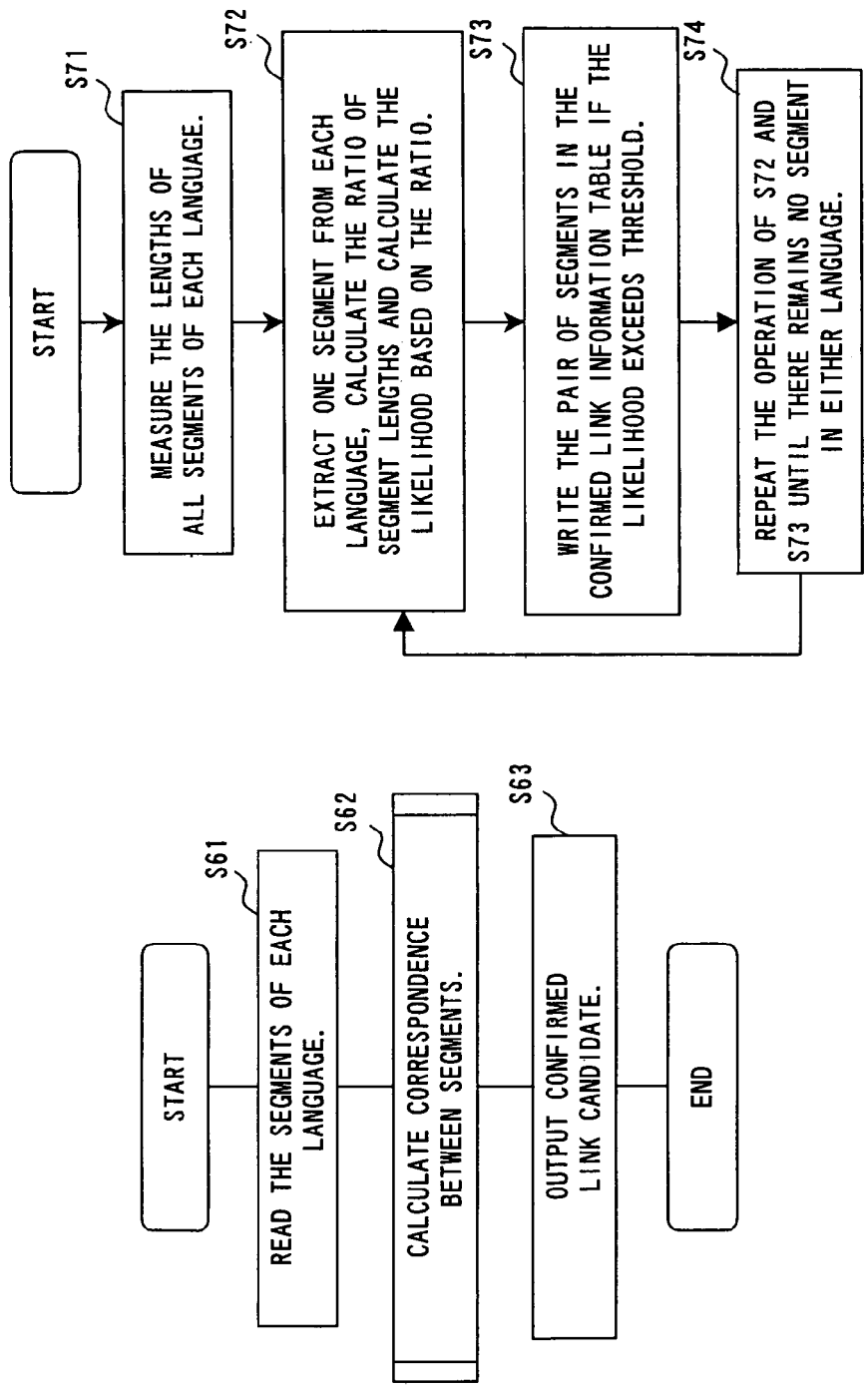
FIGS. 18A and 18B are flowcharts showing the operations of a confirmed link candidate calculation unit.

FIG. 18A is a flowchart showing the operations of the confirmed link candidate calculation unit 81. The confirmed link candidate calculation unit 81 is activated when the text input unit 41 reads the English text file 51 and Japanese text file 52.

In step S61, each segment contained in the English and Japanese texts are read. In step S62, correspondence between English and Japanese segments are calculated, and one or a plurality of confirmed link candidates are determined. Then, in step S63, a confirmed link candidate is outputted. The confirmed link edition unit 42 provides the determined confirmed link candidate to the user via the graphical user interface 55.

FIG. 18B is a flowchart showing an example of the process of calculating a confirmed link candidate. This process corresponds to the process in step S62 shown in FIG. 18A.

In step S71, the length of each segment composing the English text and the length of each segment composing the Japanese text are calculated. The segment length is, for example, detected by the number of words or characters contained in each segment.

In step S72, firstly, one segment is selected from each of the English and Japanese texts. Then, the ratio of length between a segment selected from the English text and a segment selected from the Japanese text is calculated. The likelihood that the selected Japanese segment is the translation of the selected English segment is calculated according to the "ratio". In the translation of a natural language, it is estimated that the ratio between the length of a segment in an original text and that of a translated segment takes an almost constant value. Therefore, in step S72, the likelihood can be calculated based on whether the ratio of segment length calculated as described above is close to that of estimated in the English/Japanese translation.

If the likelihood calculated in step S72 exceeds a predetermined threshold, the set of selected segments are written into the confirmed link information table 101 in step S73. Specifically, a link connecting the set of selected segments is registered in the confirmed information table 101 as a confirmed link candidate. The step S74 is used to perform steps S72 and S73 for each set of segments.

In this way, the confirmed link candidate calculation unit 81 provides a link connecting segments with a high likelihood in correspondence to a user as a confirmed link candidate. Then, the user can specify a confirmed link by referring to the confirmed link candidate, thereby reducing the load of the user when specifying a confirmed link.

A method for determining a confirmed link candidate is not limited to the method described with reference to FIG. 18B. For example, the distribution of the lengths of segments contained in an English text and that of the lengths of segments contained in a Japanese text is compared and a confirmed link candidate can be determined based on the result of the comparison. Alternatively, a translation dictionary for translating an English text into a Japanese text and vice versa is prepared and a confirmed link candidate can be determined by referring to the translation dictionary when comparing English segments and Japanese segments.

Although in the above-mentioned embodiment, the confirmed link candidate calculation unit 81 provides a confirmed link candidate to a user and the user specifies by referring to the candidate, the present invention is not limited to this configuration. Specifically, if the likelihood in the confirmed link candidate determined by the confirmed link candidate calculation unit 81 is high, the confirmed link candidate can be used as a confirmed link without determination by a user.

As one specific implementation of the translation correlation support system in the embodiment of the present invention, a user specifies a confirmed link only for segments whose correspondence is very clear, such as segments including a title of a chapter appearing in the midst of a document or the like, and the translation correlation support system correlates the other segments based on such confirmed links.

Figure 19:
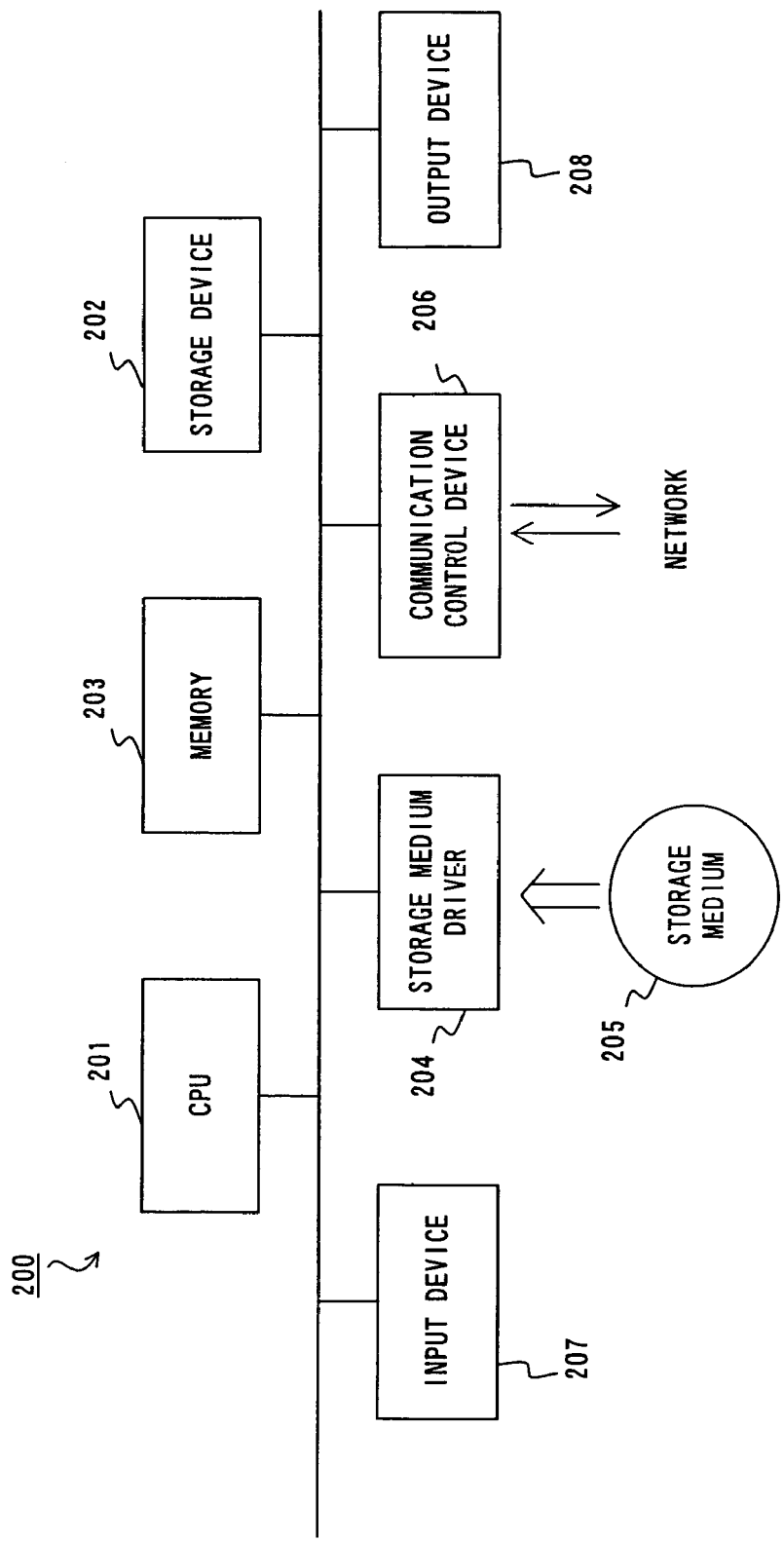
FIG. 19 shows the configuration of a computer for executing a program describing the process of the present invention.

FIG. 19 shows the configuration of a computer for executing a program describing the process of the above-mentioned flowchart.

A CPU 201 loads a program describing the process shown in the above-mentioned flowchart from a storage device 202 to a memory 203 and executes it. The storage device, which is a hard disc device for example, stores the program. The storage device 202 can also be an external storage device connected to the computer 200. For the memory 203, semiconductor memory or the like can be used as the work area of the CPU 201.

A storage medium driver 204 accesses a portable storage medium 205 according to the instructions of the CPU 201. For the portable storage medium 205, a semiconductor device (such as a PC card, etc.), a medium to/from which information is magnetically inputted/outputted (such as a flexible disk, a magnetic tape, etc.), a medium to/from which information is optically inputted/outputted (such as an optical disk, etc.) or the like is used. A communication control device 206 transmits/receives data via a network, according to the instructions of the CPU 201.

For an input device 207, a keyboard, a mouse or the like is used. A user specifies a confirmed link, or adds, deletes and modifies the link using this input device 207. An output device 208 is a display device and displays correspondence between segments.

Figure 20:
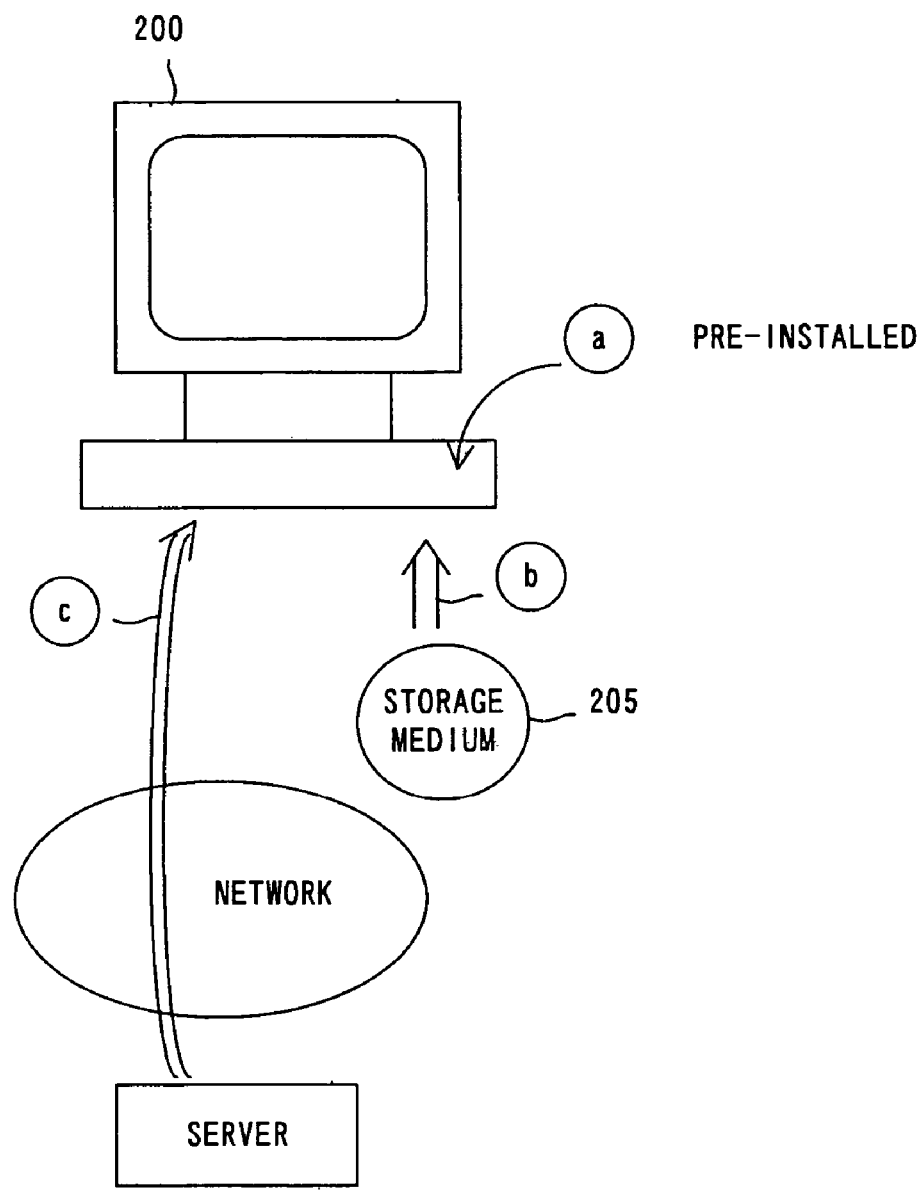
FIG. 20 explains how to provide the software program of the present invention.

FIG. 20 explains how to provide the software program of the present invention. The program of the present invention is provided by an arbitrary one of the following three methods.

(1) The program is installed in a computer and is provided. In this case, for example, the program is installed in the computer 200 before shipment.

(2) The program is stored in a portable storage medium and is provided. In this case, the program to be stored in the portable storage medium 205 is basically installed in the storage device 202 via the storage medium driver 204.

(3) The program is provided by a program server installed in a network. In this case, the computer 200 obtains a corresponding program by downloading it from the program server. Alternatively, the server can execute the program and the computer 200 can be provided with a function corresponding to the program.

Although in the above-mentioned embodiment, the correspondence between an original document described in a natural language and its translation is described, the application of the present invention is not limited to this. Specifically, the application of the present invention is not limited to documents described in a natural language. For example, the present invention can also be applied to the correspondence between computer languages. The application of the present invention is not limited to the correspondence between a document described in a first language and one described in a second language. For example, the present invention can also be applied when comparing the DNA of human being with that of a living thing other than human being.

What is claimed is:

1. A translation correlation device for correlating a plurality of segments composing a first text described in a first language to a plurality of segments composing a second text described in a second language, comprising:
   a receiving unit for receiving correspondence information, which is defined by a user, indicating that a part of the plurality of segments composing the first text is correlated to a part of the plurality of segments composing the second text;
   a detection unit for detecting correspondence between other segments which are not defined by the correspondence information in the first text and other segments which are not defined by the correspondence information in the second text according to the correspondence information received by said receiving unit, said detection unit detecting correspondence between segments composing the first text and segments composing the second text, based on a distance from a segment specified by the correspondence information received by said receiving unit; and
   an output unit for outputting information indicating the correspondence detected by said detection unit.

2. The translation correlation device according to claim 1, further comprising
   a paragraph detection unit for dividing each of the first and second texts into a plurality of paragraphs according to the correspondence information received by said receiving unit, and detecting correspondence between the plurality of paragraphs composing the first text and the plurality of paragraphs composing the second text.

3. The translation correlation device according to claim 2, wherein said detection unit detects correspondence between segments composing the first text and segments composing the second text for each paragraph.

4. The translation correlation device according to claim 1, further comprising
   a providing unit for providing candidate information for enabling a user input the correspondence information.

5. A storage medium which stores a translation correlation program for correlating a plurality of segments composing first information to a plurality of segments composing second information, said program comprising:
   receiving correspondence information, which is defined by a user, indicating that a part of the plurality of segments composing the first information is correlated to a part of the plurality of segments composing the second information;
   a detection unit for detecting correspondence between other segments which are not defined by the correspondence information in the first text and other segments which are not defined by the correspondence information in the second text according to the correspondence information received by said receiving unit; and
   outputting information indicating the detected correspondence;
   wherein correspondence between segments composing the first text and segments composing the second text is detected based on a distance from a segment specified by the correspondence information.

6. The storage medium according to claim 5, wherein the first information is a first text described in a first language, and the second information is a second text described in a second language.

7. The storage medium according to claim 6, said program further providing
   dividing each of the first and second texts into a plurality of paragraphs according to the correspondence information, and detecting correspondence between the plurality of paragraphs composing the first text and the plurality of paragraphs composing the second text.

8. The storage medium according to claim 7, wherein correspondence between segments composing the first text and segments composing the second text is detected for each paragraph.

9. The storage medium according to claim 6, said program further providing
   providing candidate information for enabling a user input the correspondence information.

* * * * *

UNITED STATES PATENT AND TRADEMARK OFFICE
CERTIFICATE OF CORRECTION

PATENT NO.        : 7,308,398 B2                                        Page 1 of 1
APPLICATION NO.   : 11/289318
DATED             : December 11, 2007
INVENTOR(S)       : Tatsuo Yamashita et al.

It is certified that error appears in the above-identified patent and that said Letters Patent is hereby corrected as shown below:

Column 14, Line 39, after "providing" delete "providing" (Second Occurrence).

Signed and Sealed this

Seventeenth Day of June, 2008

JON W. DUDAS
*Director of the United States Patent and Trademark Office*